July 22, 1952    N. F. ALVARE    2,604,219
SELF-LOADING MOTOR TRUCK
Filed Feb. 5, 1949    4 Sheets-Sheet 4
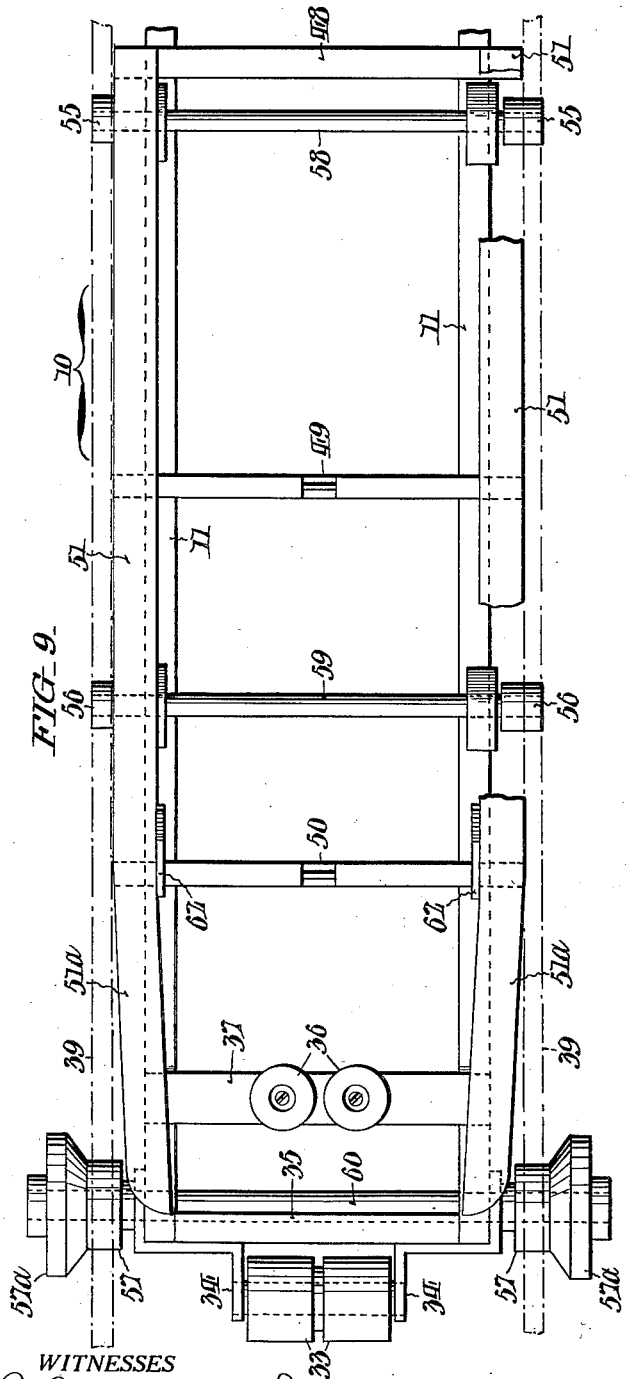
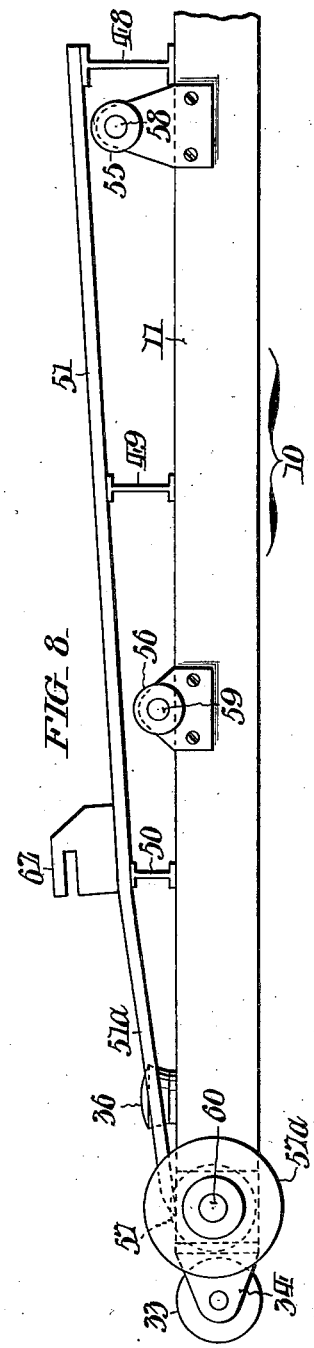
WITNESSES
INVENTOR:
Nemesio F. Alvare,
BY
ATTORNEYS.

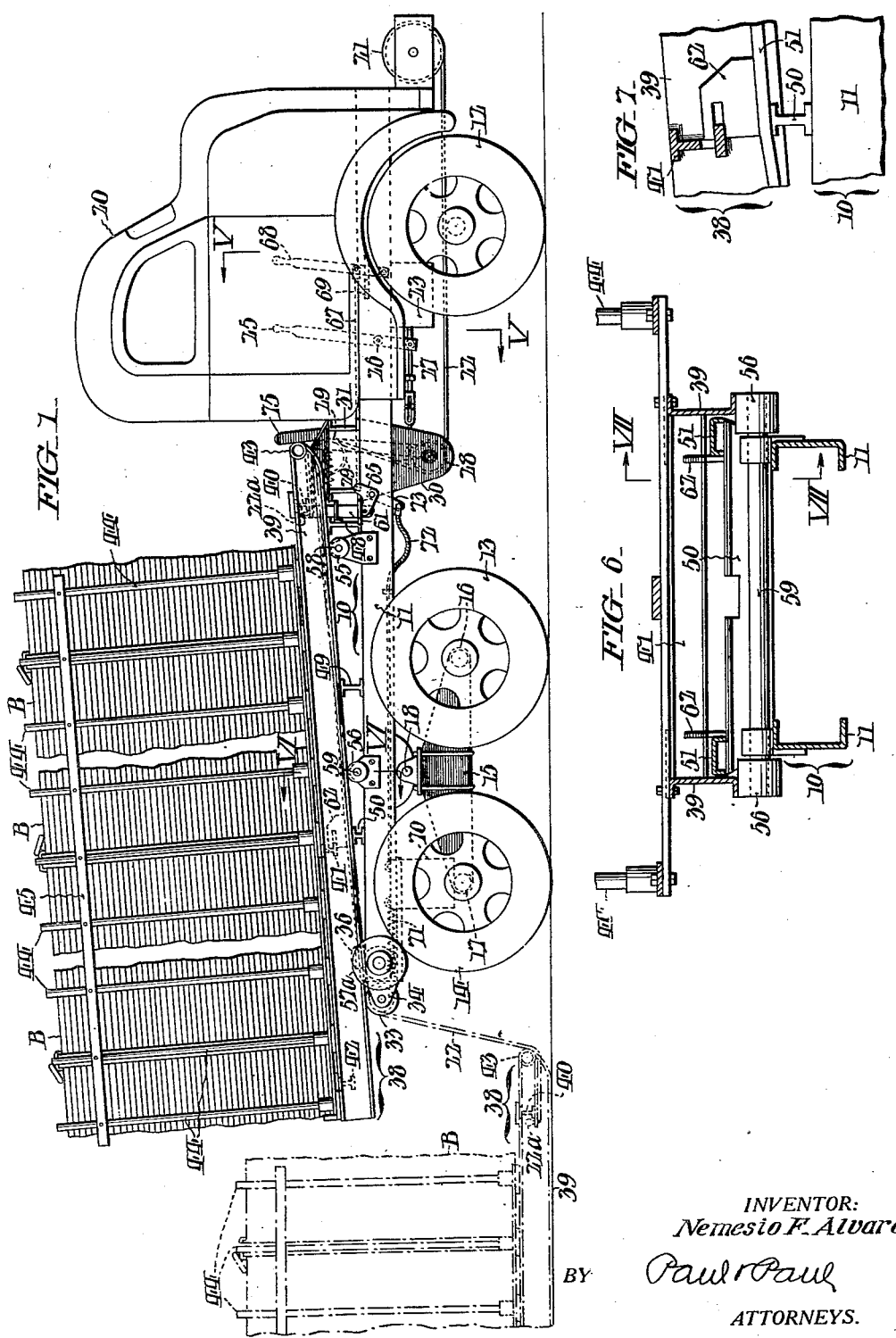

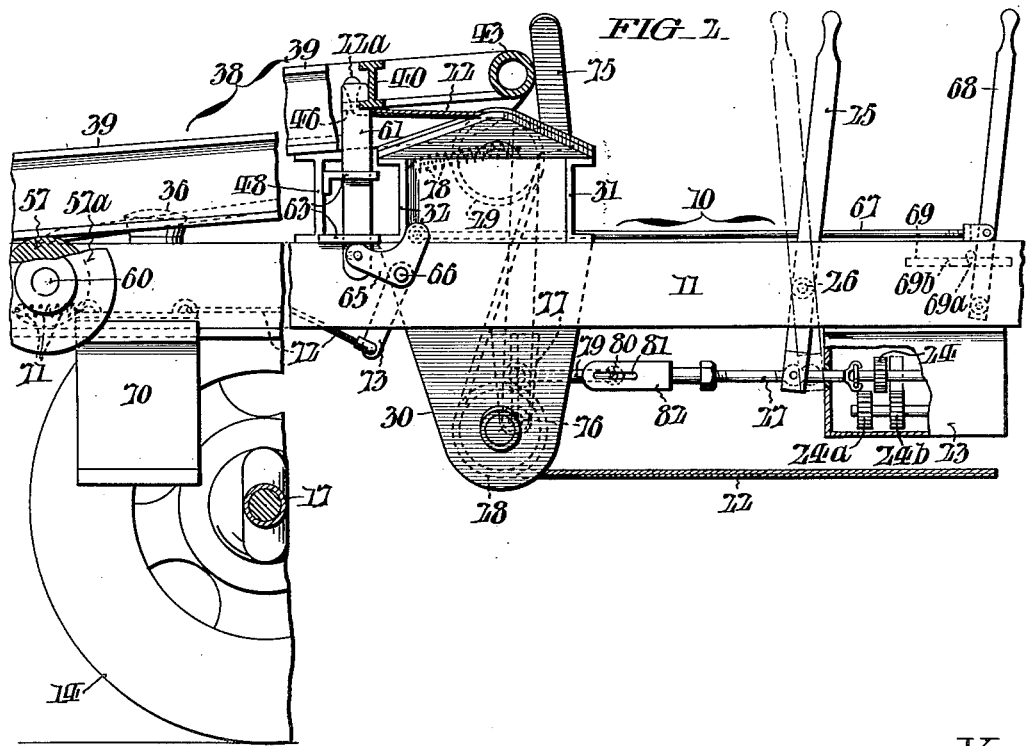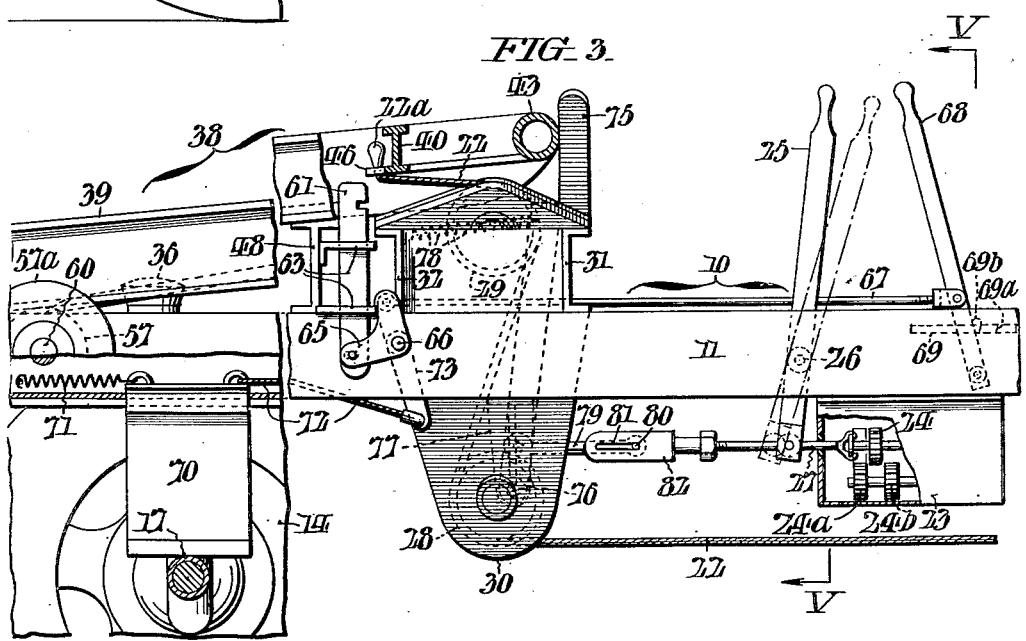

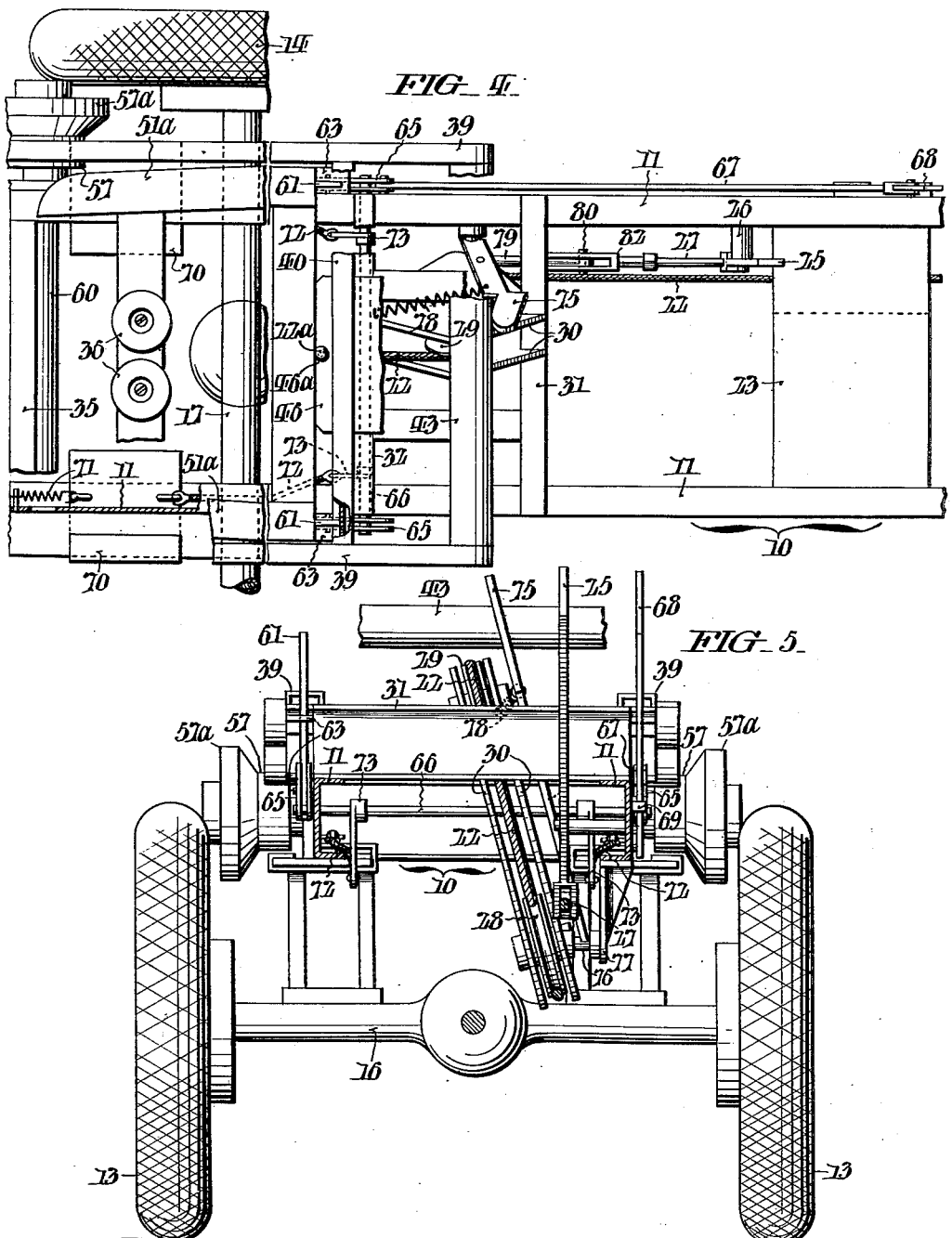

Patented July 22, 1952

2,604,219

UNITED STATES PATENT OFFICE 2,604,219

SELF-LOADING MOTOR TRUCK

Nemesio F. Alvare, Philadelphia, Pa.

Application February 5, 1949, Serial No. 74,814

7 Claims. (Cl. 214—85)

This invention relates to self-loading motor trucks of the type featured in a co-pending application Serial No. 28,016 filed by me on May 19, 1948, and now Patent No. 2,508,740 granted May 23, 1950, designed more particularly for the purpose of transporting cut sugar cane or the like from the fields in which it is grown, to refineries or to railway freight stations for ultimate delivery to remote points. As the cane is cut in the field, it is stacked into several piles upon a skid at the ground level and the piles tied with bands or cords into individual bundles for convenience of ready removal upon delivery at a refinery or at the railway station with the aid of a lifting crane. After the skid is loaded in the field it is drawn up by a power driven chain or cable onto the motor truck backed into position to receive it for transport to the desired destination.

Due to the great weight of the filled skid, there has been a tendency of the truck front to up-end, i. e., to pivot about the rear or drive wheel axle as the skid is drawn up, and to suddenly drop later as the skid reaches its final position, often with attendant damage to the skid or to the truck or to both. One of the aims of my present invention is to guard against this contingency, this objective is realized in practice as hereinafter more fully disclosed, through provision of simple and reliable preventative means for the purpose.

Another object of the present invention is to provide improved means for more effectively guiding the skid onto the truck regardless of whether or not the truck is properly aligned with the skid in being backed up to it.

A further object of my invention is to provide mechanism automatically operable to shut off the power drive for the draw chain or cable as the skid reaches its final position on the truck.

Still another object of my invention is to provide improved means operable from within the driver's cab of the truck to lock the skid against shifting and bouncing during transit.

Other objects and attendant advantages will appear from the following detailed description of the attached drawings wherein:

Fig. 1 is a view in side elevation of a self-loading motor truck conveniently embodying my invention.

Fig. 2 is a fragmentary view of the truck in side elevation drawn to a larger scale, with portions thereof broken out and shown in longitudinal section.

Fig. 3 is a view like Fig. 2 with certain movable parts differently positioned.

Fig. 4 is a broken out view in top plan corresponding to Fig. 3.

Fig. 5 is a transverse section taken as indicated by the angled arrows V—V in Figs. 1 and 3.

Fig. 6 is a transverse section taken as indicated by the angled arrows VI—VI in Fig. 1.

Fig. 7 is a fragmentary detailed sectional view taken as indicated by the angled arrows VII—VII in Fig. 6.

Fig. 8 is a fragmentary view in side elevation of rear end portion of the chassis frame of the truck drawn to enlarged scale; and Fig. 9 is a view in top plan corresponding to Fig. 8.

As herein illustrated, my improved motor truck is, generally speaking, of standard construction in that it has a chassis frame 10 with laterally spaced parallel sill channels 11 supported at the front end by steering wheels 12, and at the rear end by two pairs of juxtaposed powered driving wheels 13, 14 with interposed leaf springs 15 bridged between the rear axle housings 16, 17 and medially fulcrumed to said sills at 18. The truck is equipped at the front end of its chassis frame 10 forward of the usual driver's cab 20, with a winch 21 for a draw chain or cable 22, said winch being operable, through connections not illustrated, from a gear transmission 23 powered from the truck motor in a well known manner. The gear 24 of the transmission 23 is shiftable from within the cab 20 by means of a hand lever 25 which is medially fulcrumed on one of the chassis sills 11 at 26 with its lower end connected to the shift rod 27 for said gears.

From the winch 21, the cable 22 is passed first around two vertically spaced guide sheaves 28, 29 located immediately to the rear of the cab 20. The sheaves 28, 29 are rotatively supported between bearing plates 30 secured centrally of the truck in the interval between a pair of channel beams 31, 32 extending crosswise between the tops of the chassis sills 11. From the sheave 29 the cable extends rearward horizontally and passes over a grooved guide roller 33 rotative in bearing brackets 34 centrally of the cross member 35 which connects the chassis sills 11 at the rear end of the truck. A pair of closely spaced vertical axis rollers 36 on another cross member 37 somewhat forward of the cross member 35, assist in holding the cable 22 to the longitudinal center of the truck.

The skid, comprehensively designated 38, is identical in construction with the skid in the Patent 2,508,740 hereinbefore referred to, having parallel floor-supporting runners 39 which are connected, at suitable intervals, by transverse I-beams 40, 41 and 42 whereof the vertical depth is slightly less than that of said side rails. As shown, the runners 39 extend forwardly beyond the beam 40 and their front ends are rounded at the bottom and connected by a tubular cross member 43. Rising at each side of the skid 38 from the flooring is a series of spaced posts 44 which, adjacent their tops, are connected by a tie bar 45, and by which the cane bundles B are confined to the skid. To the beam 40 adjacent the front end of the skid is secured, at the center, a plate 46 with a notch 46a in its rear edge for detachable connection of the knotted or headed end 22a of the cable 22.

Affixed to I-beams 48, 49, 50, extending crosswise of the chassis frame sills 11 at longitudinal intervals, are laterally spaced inverted channel rails 51 which are sloped downwardly at a slight angle to the horizontal toward the rear end of the truck where they converge as at 51a in Fig. 9.

For the support of the skid 38 on the truck, there are provided at opposite sides of the latter at intervals of the length of the chassis frame, horizontal axis rollers 55, 56, 57. The rollers 55, 56 have plain threads and are freely rotative respectively about the opposite ends of shafts 58 and 59 supported in bearing brackets at the outer faces of the chassis sills 11, and the respective pairs laterally spaced to correspond with the spacing of the runners 39 of the skid. The rearmost rollers 57 are larger than the rollers 55, 56 and are likewise freely rotative about the ends of a shaft 60 which extends through the chassis sills 11, and are moreover formed with inwardly coned flaring flanges 57a at their outer sides.

The skid 38 is held against shifting and also against bouncing up and down on the truck during transit through engagement of the rear bottom flange of the foremost cross beam 40 within the edge notches of a pair of vertically arranged latch elements 61, and through engagement of the front bottom flange edges of the medial cross member 41 within the edge notches of upright hold down members in the form of plates 62 affixed to the inner sides of the rails 51. The latch elements 61 are constrained to up and down sliding movement in guides 63 on the transverse beam 48 of the chassis frame, and are pivotally connected at their lower ends to bell cranks 65 on a transverse rock shaft 66. One of the bell cranks 65 is coupled, by means of a link rod 67, to another hand lever 68 accessible for actuation within the driver's cab 20. The lever 68 is laterally flexible to permit selective engagement with stop notches 69a and 69b in a fixed stop bar 69 to hold the latch elements 61 either withdrawn or in their skid locking positions.

The means which I have provided for preventing up-ending of the truck front as the skid is drawn into place thereon, includes a pair of wedge blocks 70 which are slidable along the bottom flanges of the chassis sills 11 adjacent the ends of the latter, and which are normally held in the retracted idle position in which they are shown in Fig. 2 by springs 71. Through flexible connectors 72, the wedge blocks 70 are coupled with pendent arms 73 on rock shaft 66 so as to be drawn against the pull of springs 71 to a position over the rear wheel housings 17 as in Fig. 3 when the hand lever 68 is operated to retract the latch elements 61 in preparation for reception of the skid 38.

For the purpose of automatically stopping the winch 21 as the skid 38 reaches its final position on the truck, I have provided a lever arm 75 which is fulcrumed at 76 on a bearing bracket 77 pendent from one of the chassis frame sills 11, with its upper end projecting into the path of the tubular cross member 43 at the front end of said skid. The arm 75 is subject to a spring 78, and pivotally connected to it at a point above its fulcrum axis, is a link bar 79 with a cross pin 80 at its distal end engaged in the longitudinal slots 81 of a head 82 on the contiguous end of the gear shift rod 27 of the transmission 23.

*Operation*

Assuming that the skid 38 has been filled on the ground in the field, the truck is backed up to it, and the headed end of the cable 22 is connected to the front end of the skid at 22a as shown in broken lines in Fig. 1. The hand lever 68 is thereupon moved rearward from its normal position in Fig. 2 to the position in which it is shown in Fig. 3, whereby the latch elements 61 are concurrently retracted, i. e. moved downward, and the wedge blocks 70 at the same time pulled forward over the rear wheel axle housing 17. With this preparation, the hand lever 25 is moved from the normal full line to the broken line position in Fig. 3, and the gear pinion 24 of the transmission 23 is shifted as a consequence into mesh with the drive pinion 24a as shown in broken lines whereby the winch is rotated to wind the cable 22 which is held to the groove of the roller 33 while held centered between the vertical axis rollers 36. By the pull of the cable, the front end of the skid is first lifted and its runners 39 initially engaged with the flanged rollers 36 at the rear end of the truck. As the pull continues, the skid will be drawn forward at an inclination on the rollers 36 for a time until its gravity center has advanced beyond said rollers, when it will drop until its runners 39 rest on the rollers 59. By further pull of cable 22, the runners 39 of the skid will eventually engage with the rollers 58 as it reaches its final position on the truck. During the above procedure, the skid will be properly centered on the truck through camming action of the coned flanges of rollers 36 with the runners 39 notwithstanding that the truck may not have been accurately aligned initially with the skid in being backed up to it. Also during the procedure, the convergent rear end portions 51a of the guard rails 51 on the chassis serve, by cooperation with the runners 39, to assist in guiding the skid so that it will eventually be longitudinally aligned properly on the truck. When finally positioned on the truck, the skid will be held from shifting sidewise by the guard rails 51 in a manner readily understood from Fig. 6. Upon encounter of the frontal cross bar 43 of the skid with the lever 75 as in Fig. 3, through the medium of the pin 80 the rod 79 will cause the rod 27 to be shifted rightward, with consequent automatic disconnection of the gears in the transmission 23 and stoppage of the winch 21. The truck driver thereupon moves the lever 68 forward for elevation of the latch elements 61 to active position whereupon, as the skid recedes slightly on the rollers 55, 56, 57, the flanges of the cross beams 40 and 41 will enter the notches respectively of said elements and of the fixed hold down members 62 as shown in Figs. 2 and 7. The skid is thus effectively secured against shifting longitudinally of the truck and also against the possibility of bouncing up and down during transit. When the lever 68 is operated to raise the elements 61 to locking position as just explained, the flexible connections 72 are slacked as in Fig. 1, so that as the truck gets under way and the rear wheel springs 15 flex, the wedge blocks 70 will be automatically withdrawn to inactive position as in Fig. 2 by the springs 71. After unloading of the cane bundles B at the delivery destination and return of the truck to the field, the empty skid is moved forwardly slightly under power so that the latch elements 61 can be withdrawn out of the way of the beam 40, by moving the hand lever 68 rearwardly to the position shown in Fig. 3. This step is made possible by virtue of the lost motion allowed by the pin and slot connection 80, 81 between the sections 27 and 79 of the gear shifting mechanism of the transmission 23, and is brought about by moving the hand lever 25 rearward from the normal line to the dotted line position in Fig. 2 so that the gear pinion 24 is momentarily shifted into engagement with the powered pinion 24b.

Having thus described my invention, I claim:

1. In a self-loading skid-carrying motor truck, a wedge block guided for movement along the bottom of the chassis frame of the truck; means for moving the block from a normally retracted position to a position between the chassis frame and the axle housing of the propelling wheels of the truck to prevent flexure of springs connecting the axle housing with the chassis and so preclude up-ending of the truck front as a skid is drawn forwardly onto the truck from the ground level, said means comprising an actuated hand lever convenient of access from a driver's seat at the front end of the truck, and a flexible connection between the block and the lever; and yielding means for automatically retracting the block to its normal position as the truck gets under way.

2. In a self-loading skid-carrying motor truck, a wedge block guided for movement along the bottom of the chassis frame of the truck; means for moving the block from a normally retracted position to a position between the chassis frame and the axle housing of the propelling wheels of the truck to prevent flexure of springs connecting the axle housing with the chassis and so preclude up-ending of the truck front as a skid is drawn forwardly onto the truck from the ground level, said means comprising an actuating hand lever convenient of access from a driver's seat at the front end of the truck, and a flexible connection between the block and the lever; latch means on the chassis frame to prevent longitudinal shifting of the skid during transit; and linkage connections through which the latch means is operable by means of the hand lever.

3. In a self-loading skid-carrying motor truck, a wedge block guided for movement along the bottom of the chassis frame; means for moving the block from a normally retracted position to a position between rear-end of the chassis frame of the truck and the axle housing of the propelling wheels of the truck to prevent flexure of springs connecting the axle housing with the chassis and so preclude up-ending of the truck front as skid is drawn forwardly onto the truck from the ground level, said means comprising an actuating hand lever convenient of access from a driver's seat at the front end of the truck, and a flexible connection between the block and the lever; latch means in the form of a vertically slidable stop bolt adapted to engage behind a cross member of the skid and thereby prevent the skid from shifting during transit; and a linkage through which the latch bolt is operable by means of the hand lever.

4. In a self-loading skid-carrying motor truck, a wedge block guided for movement along the bottom of the chassis frame of the truck; means for moving the block from a normally retracted position to a position between the chassis frame and the axle housing of the rear propelling wheels of the truck to prevent flexure of springs connecting the axle housing with the chassis and so preclude up-ending of the truck front as a skid is drawn forwardly onto the truck from the ground level, said means comprising an actuating hand lever convenient of access from a driver's seat at the front end of the truck, and a flexible connection between the block and the lever; latch means in the form of a normally-retracted vertically-slidable stop bolt on the chassis adapted to engage behind a frontal cross member of the skid and thereby prevent the latter from shifting longitudinally of the truck during transit, said bolt having a forwardly-open notch to engage over the cross member to hold down the skid; and a linkage through which the latch bolt is operable by means of the hand lever.

5. In a self-loading skid-carrying motor truck, a wedge block guided for movement along the bottom of the chassis frame; means for moving the block from a normally retracted position to a position between the chassis frame of the truck and the axle housing of the rear propelling wheels of the truck to prevent flexure of springs connecting the axle housing with the chassis and so preclude up-ending of the truck front as a skid is drawn forwardly onto the truck from the ground level, said means comprising an actuating hand lever convenient of access from a driver's seat at the front end of the truck, and a flexible connection between the block and the lever; latch means in the form of a normally-retracted vertically-slidable stop bolt on the chassis adapted to engage behind a frontal cross member of the skid and prevent the latter from shifting longitudinally of the truck during transit, said bolt having a forwardly-open notch to engage a flange on the cross member to hold down the skid; a linkage through which the latch bolt is projectable into active position by means of the hand lever, and a fixed auxiliary element on the chassis having a rearwardly open notch for engaging another cross member further rearward on the skid.

6. In a self-loading motor truck, a winch for a draw cable and a shift gear transmission for driving the winch; a skid adapted to be loaded on the ground level and to be connected to the cable so as to be drawn onto the truck from the rear; a lever convenient to a driver's seat at the front of the truck for actuating the shift gear of the transmission; a latch element on the truck for engaging behind a cross member of the skid to prevent shifting of the latter longitudinally of the truck during transit; a second hand lever adjacent the first mentioned hand lever and interposed connections for actuating the latch element; and means automatically operative when the skid is drawn up into position on the truck by the cable, to shift the gear of the transmission and thereby stop the winch.

7. In a self-loading motor truck, a winch for a draw cable and a shift gear transmission for driving the winch; a skid adapted to be loaded on the ground level and to be connected to the cable so as to be drawn onto the truck from the rear; a lever convenient to a driver's seat at the front of the truck for actuating the shift gear of the transmission; a latch element on the truck for engaging behind a cross member of the skid to prevent shifting of the latter longitudinally of the truck during transit; a second hand lever adjacent the first mentioned hand lever and interposed connections for actuating the latch element; an arm in the path of the skid; and interposed connections whereby the gear of the transmission is automatically shifted through said arm to stop the winch as the skid is drawn up into position on the truck.

NEMESIO F. ALVARE.

REFERENCES CITED

The following references are of record in the file of this patent:

UNITED STATES PATENTS

| Number | Name | Date |
| --- | --- | --- |
| 26,421 | Fancher | Dec. 13, 1859 |
| 810,875 | Martin | Jan. 23, 1906 |
| 985,751 | Smith et al. | Feb. 28, 1911 |
| 1,351,932 | Unger | Sept. 7, 1920 |
| 1,479,593 | Fantz | Jan. 1, 1924 |
| 1,562,364 | Reasoner | Nov. 17, 1925 |
| 1,705,892 | Ballert | Mar. 19, 1929 |
| 1,739,938 | Barnett | Dec. 17, 1929 |
| 1,870,573 | Kuchar | Aug. 9, 1932 |
| 1,885,399 | Wren | Nov. 1, 1932 |
| 2,082,663 | Slater | June 1, 1937 |
| 2,089,717 | Stratton et al. | Aug. 10, 1937 |
| 2,188,374 | Sanchez | Jan. 30, 1940 |
| 2,534,156 | Wyatt et al. | Dec. 12, 1950 |
| 2,550,230 | Dalton | Apr. 24, 1951 |

FOREIGN PATENTS

| Number | Country | Date |
| --- | --- | --- |
| 160,437 | Great Britain | Nov. 18, 1921 |